Figure 1:
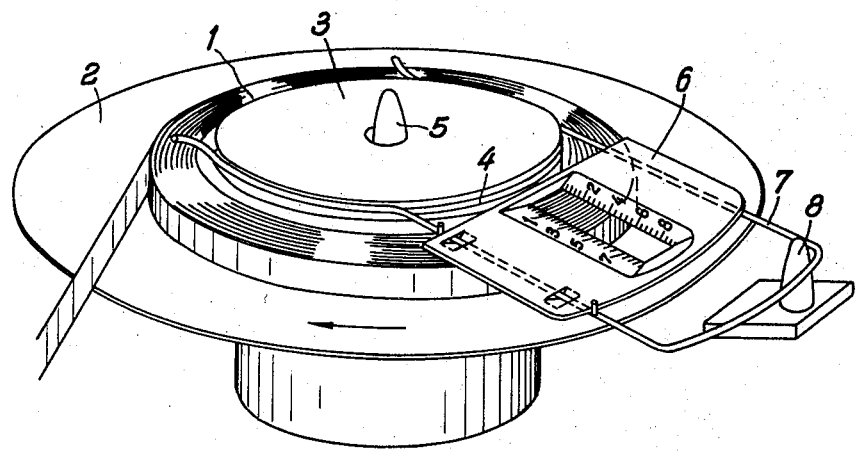

Nov. 17, 1959     S. LOEWE ET AL     2,912,763
TAPE LENGTH INDICATOR, MORE PARTICULARLY FOR MAGNETIC SOUND TAPES
Filed Aug. 1, 1956

Inventors:

United States Patent Office 2,912,763
Patented Nov. 17, 1959

2,912,763

TAPE LENGTH INDICATOR, MORE PARTICULARLY FOR MAGNETIC SOUND TAPES

Siegmund Loewe, Yonkers, N.Y., and Werner Zorn, Berlin-Zehlendorf-West, Germany

Application August 1, 1956, Serial No. 601,593

Claims priority, application Germany August 5, 1955

5 Claims. (Cl. 33—128)

With recording and reproduction by magneitc sound tapes, the clear indication of definite positions on the tape is especially important. The user of a magnetic tape recorder must be in a position to find quickly and surely any desired position of the tape, as, e.g., the beginning and end of sound performances.

Individual positions on the tape can be determined by introducing on the tape itself various numbers, letters, colours, lines, figures or similar or by measuring the length of the tape by means of counting devices or meters or also by measurement of the radius of the tape roll by means of scales arranged vertical to the positions of the tape.

It is known that these scales are to be arranged either on the carrier of the tape roll or outside this. When determining positions by measuring the diameter of the tape roll by means of a scale, care must be taken that, when reading the scale, a parallax is avoided and also that the position of the scale does not alter relative to the centre point of the tape roll.

Scales which do no press on to the tape roll, as, e.g., scales on the reel box casings, are, taking into consideration the existent parallax, unsuitable for an exact reading. Scales which are arranged on the side-pieces of the tape reel are only of limited use. If these scales are arranged on the upper side (top) of a preferably transparent tape reel, the reading is not free from parallax. If the scale records on the inner surface of the lower flange of a horizontally situated tape reel and if it is provided that the tape roll lies on this scale, then a non-parallactic reading is obtained but without any certain possibility for reading off the fractions between two lines on the scale. For the exact reading of a scale, the divisions before and after the tape position to be read must be perceptible. Should the tape roll, however, cover part of the scale and thus permit only the perception of the scale markings lying outside the tape roll, then an estimation must be made of the position of the tape roll betwen the visible scale marking and the invisible scale marking which is covered by the tape roll and can only be estimated in its position. The reading can thus only be made inaccurately. An exact estimation is, however, necessary when it is considered that about 30 positions of a long playing tape are altogether only about 1 mm. in width.

Further, it must be considered that tape roll carriers with non-centred hole, as, e.g., the known plastic tape reels, do not lie exactly central on the core pin of the reel carrier, when placed on the tape reels, since, corresponding to the purpose of application, the hole of the tape reel is larger than the diameter of the core pin of the reel carrier. The result is that the tape roll oscillates as compared to the scale fixed outside the tape reel and the reading of such a scale is also inaccurate.

It has been suggested further that a scale be used lying on the tape roll which is fastened to a rod brought from the reel core and thus also makes the oscillating movements of the tape roll. The result is a steady, non-oscillating movement of the tape position to be read with relation to the scale. This arrangement presupposes that the rod is tightly connected with the magnetic tape recorder. When putting on or taking off a reel, the rod must be brought each time in the position of measurement or removed.

The subject of the invention is a tape length indicator which permits a non-parallactic reading, makes possible the ascertainment of the position by a survey of the whole range of the scale, can be provided with an inscription and, as desired, can be transported and stored with the tape carrier for the purpose of preserving the notices. In accordance with the invention, the tape length indicator consists of a scale support, preferably lying directly on the plane of the tape roll, with radially marked divisions and fastened to a yoke, the arms of which enclose a guide groove of the tape roll carrier, arranged concentrical to the tape roll, completely or partially sliding and is secured against rotation by means of a fixed point on the magnetic tape recorder.

Figure 2:
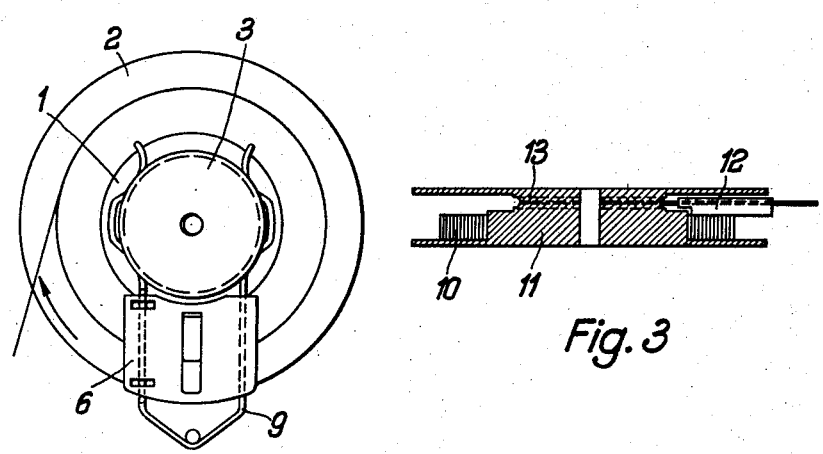
Figure 3:
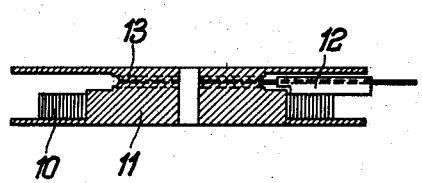

The invention is illustrated in detail by the drawings:

Fig. 1 shows the arrangement of the tape length indicator to a tape reel provided with only one reel flange, Fig. 2 represents a varied yoke form, Fig. 3 shows the position of the tape length indicator in a reel with two flanges.

According to Fig. 1, a magnetic tape 1 is wound on to a reel which is provided with only one reel flange 2 and reel core 3 of which is provided near its upper edge with a guide groove 4. The reel is conveyed in known manner via the core pin 5 of the friction disc driven by the motor of the magnetic tape recorder.

The actual tape length indicator is a scale support 6 fastened preferably movably on a yoke or rod 7 with spring effect. In the support is fitted the actual scale in the form of a slit situated radially to the reel roll with its edges bevelled and provided with divisions preferably on both sides. For measuring, the wire yoke with a light spring effect is placed in the guide groove 4 and its closed part put over a pin 8, fitted on to the bar of the magnetic tape recorder.

If now the reel is turned in the direction of the arrow and thus winds the tape on the tape roll, then the part of the scale drawn downwards glides lightly on the circular surface of the tape roll. By means of the light friction, the tape roll attempts to make the tape length indicator rotate with it. The pin 8 prevents this rotation. If the direction of rotation of reel 2 is reversed, then the tape length indicator can turn only in a small angle, i.e. up to the other side of the closed wire yoke 7, since here the pin 8 is again effective as stop or limit. The closed part of the wire yoke 7 is shown in the example U-shaped in order to alleviate the insertion of reel and tape length indicator with the wire yoke fitted over the pin 8.

As can be seen from the example given, the requirements for a non-parallactic, clear and non-oscillating reading of the scale are fulfilled in this device. As a precaution, the scale support 6 is fitted rotatable to one arm of the wire yoke 7 and can thus be laid gently on the tape roll. Two stop pins in the front arm of the wire yoke prevent a lateral displacement of the scale support 6 on the wire arm. If the reel core 3 lies eccentric over the core pin 5, which, with consideration of the usual production tolerances, is not to be avoided and if as a result the reel core 3 knocks, on rotation of the tape reel, with respect to the centre axle of the core pin 5 and thus the tape roll with respect to the centre point of the core pin 5, the tape roll, however, does not so oscillate in the scale section since the scale is led via the wire yoke 7 in the groove of the core 3 and thus oscillates in the same rhythm as the core 3 and the tape roll. The movement of the tape roll relative to the scale is thus always steady and not oscillatory.

According to Fig. 2, the form of the wire yoke 9 is represented in an altered shape. If it is also desired to prevent the slight rotation of the tape length indicator with reversal of the tape movement, then the closed part of the wire yoke can be formed, for example as a triangle or provided with a radial slit, the width of which corresponds to the diameter of the pin. In order also to limit the friction of the wire yoke in the groove of the core 3, the bearing arrangement of the wire yoke can be made at three or more points or sections within the groove of the core 3.

Fig. 3 shows the arrangement of the tape length indicator within a tape reel with two flanges. The tape roll 10 is in the lower part of the tape reel 11 whilst the tape length indicator 12 is conveyed in a groove between the side-pieces of the tape reel. The top reel side-piece is formed transparent and without openings for clear readableness of the scale.

The scale support 6 can also be made so that it can be inscribed on one or both sides. Beginnings and endings of sound tracings or other desired remarks remain in this case connected with the tape roll carrier and thus there is no occasion for them to be mistaken for other tapes.

As regards the material for the tape length indicator, metal, cellulose or plastic can be used. The scale support 6 can be stamped out of plastic sheeting or produced by die-casting whereby, at least, for the surfaces covered by the divisions and their surroundings a washable plastic capable of being inscribed is to be chosen.

For the rest, the divisions are best made coloured, more particularly in several colours. It could also be desirable to arrange a fixed or detachable magnifying glass or another known means for magnifying the divisions in order to improve the accuracy of reading.

What we claim is:

1. In a magnetic tape apparatus a tape length indicator for magnetic tapes, comprising in combination, at least one tape reel having a core on which said tape is wound, said core extending axially beyond the edge of the tape a yoke having arms which slidably embrace the outer surface of the extended part of said core, and a scale, the markings of said scale being arranged radially of the tape windings and along said windings, said scale being fastened to said yoke, the peripheral part of said yoke being fastened to a fixed part of said apparatus.

2. A tape length indicator according to claim 1, in which said yoke arms are resilient.

3. A tape length indicator according to claim 2, in which said yoke arms are shaped in such a manner that the outer surface of the part of said core extending beyond the edge of the tape is touched by said yoke at several points.

4. A tape length indicator according to claim 1, in which said scale is rotatably fastened on one arm of said yoke.

5. A magnetic tape apparatus according to claim 1, in which said tape reel has a flange on the side of said tape the wound-on tape front lying opposite to said scale.

References Cited in the file of this patent

UNITED STATES PATENTS

| | | |
|---|---|---|
| 8,398 | Parsons | Sept. 30, 1851 |
| 973,731 | Watkins | Oct. 25, 1910 |
| 1,086,472 | Schulz | Feb. 10, 1914 |
| 1,468,636 | Hoeft | Sept. 25, 1923 |
| 1,688,824 | Meissner | Oct. 23, 1928 |
| 1,776,470 | Jones | Sept. 23, 1930 |
| 1,865,835 | Colby | July 5, 1932 |
| 1,933,659 | Curran | Nov. 7, 1933 |
| 2,007,986 | Sprague | July 16, 1935 |
| 2,048,906 | Webster | July 28, 1936 |
| 2,077,828 | Dombrowski | Apr. 20, 1937 |
| 2,273,701 | Funke | Feb. 17, 1942 |
| 2,651,235 | Barrows | Sept. 8, 1953 |